April 18, 1939.   F. J. WILKINS   2,155,030
BRAKE OPERATING MECHANISM
Filed Dec. 24, 1937   4 Sheets-Sheet 2
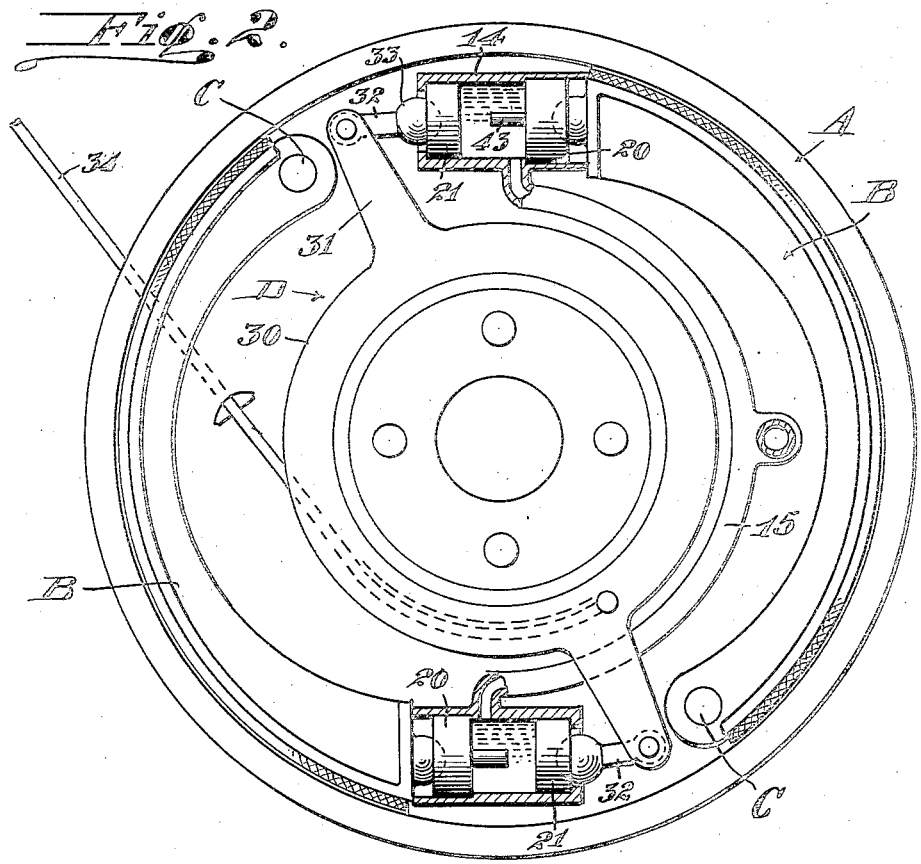
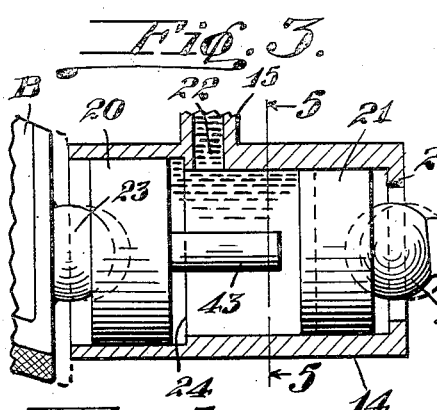
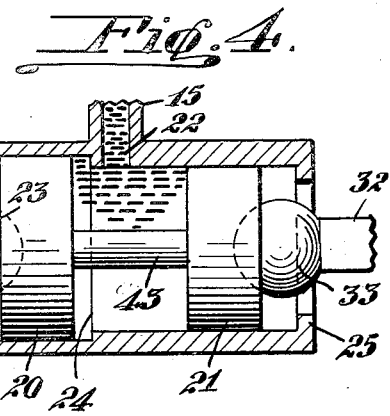
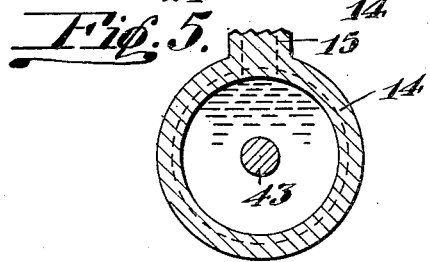
Inventor
Fredric J. Wilkins
R. S. Berry
By
Attorney April 18, 1939.   F. J. WILKINS   2,155,030
BRAKE OPERATING MECHANISM
Filed Dec. 24, 1937    4 Sheets-Sheet 3
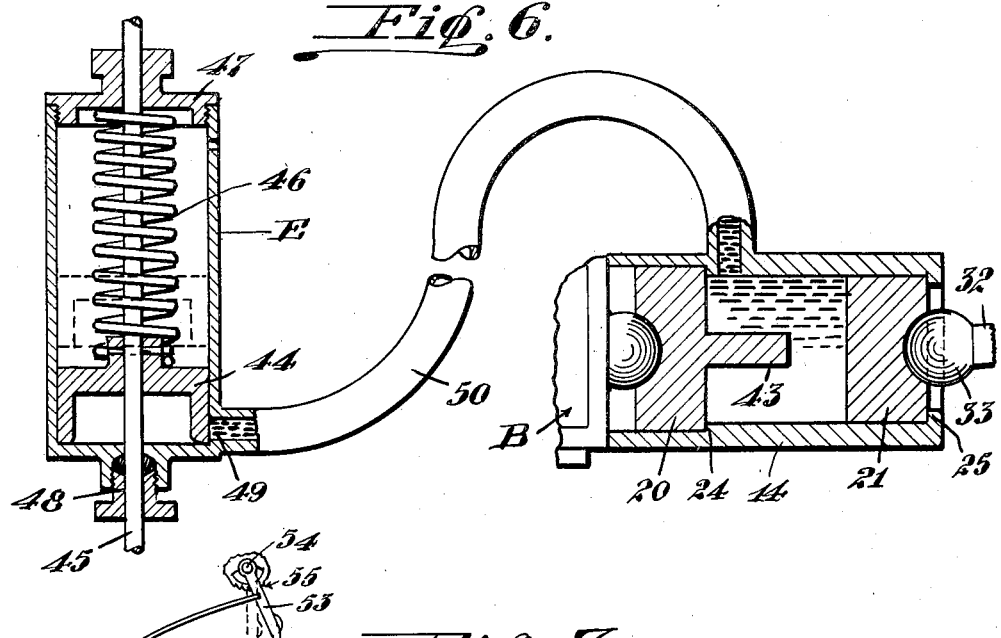
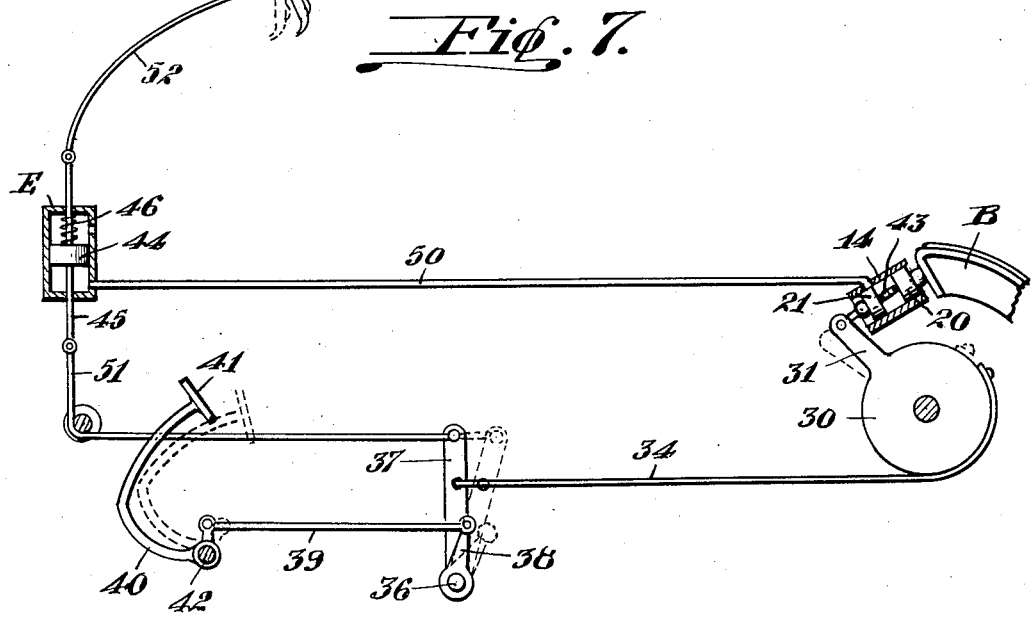
Inventor
Fredric J. Wilkins
By
Attorney April 18, 1939.   F. J. WILKINS   2,155,030
BRAKE OPERATING MECHANISM
Filed Dec. 24, 1937   4 Sheets-Sheet 4
Fig. 8.
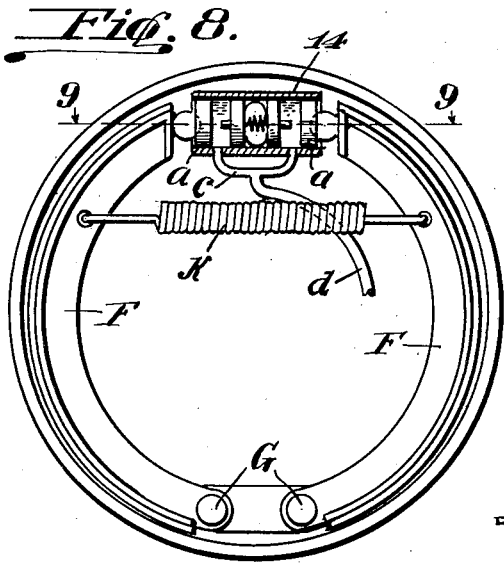
Fig. 9.
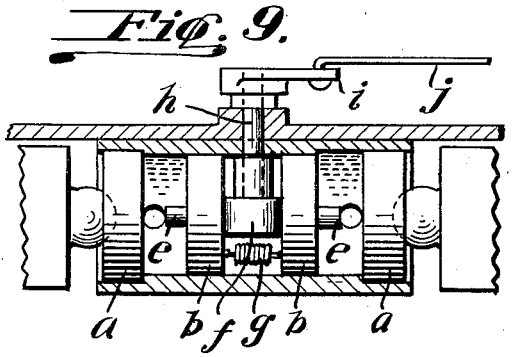
Fig. 10.
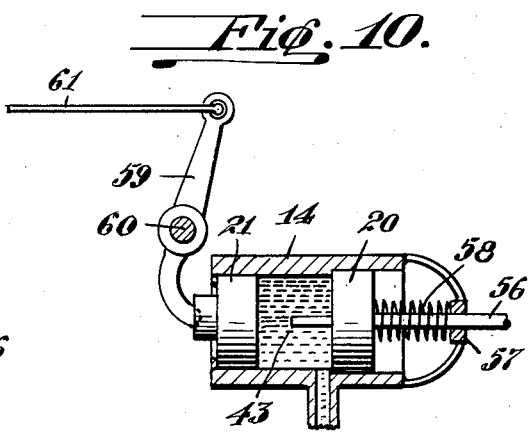
Fig. 11.
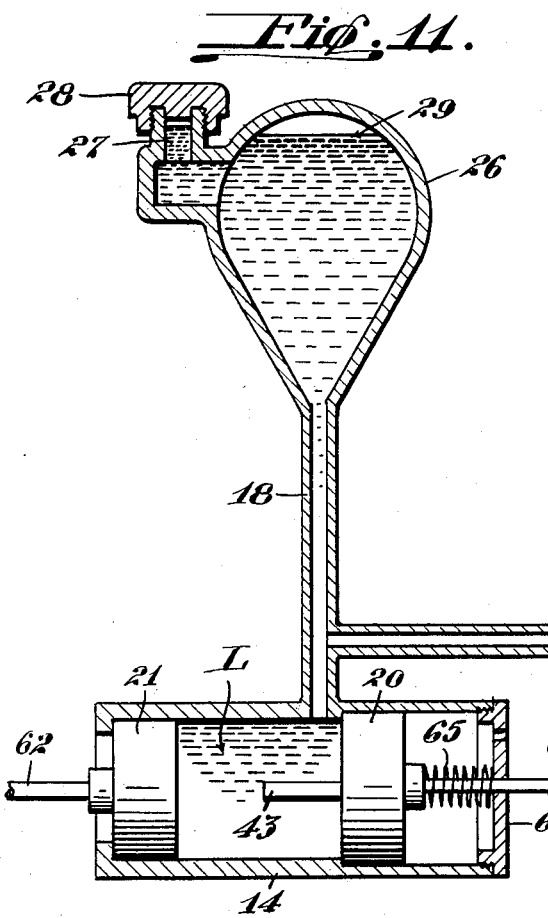
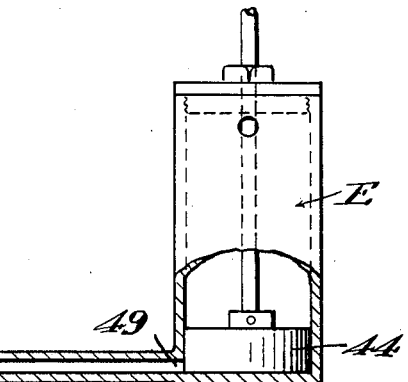
Inventor
Fredric J. Wilkins
By R. S. Berry
Attorney Patented Apr. 18, 1939

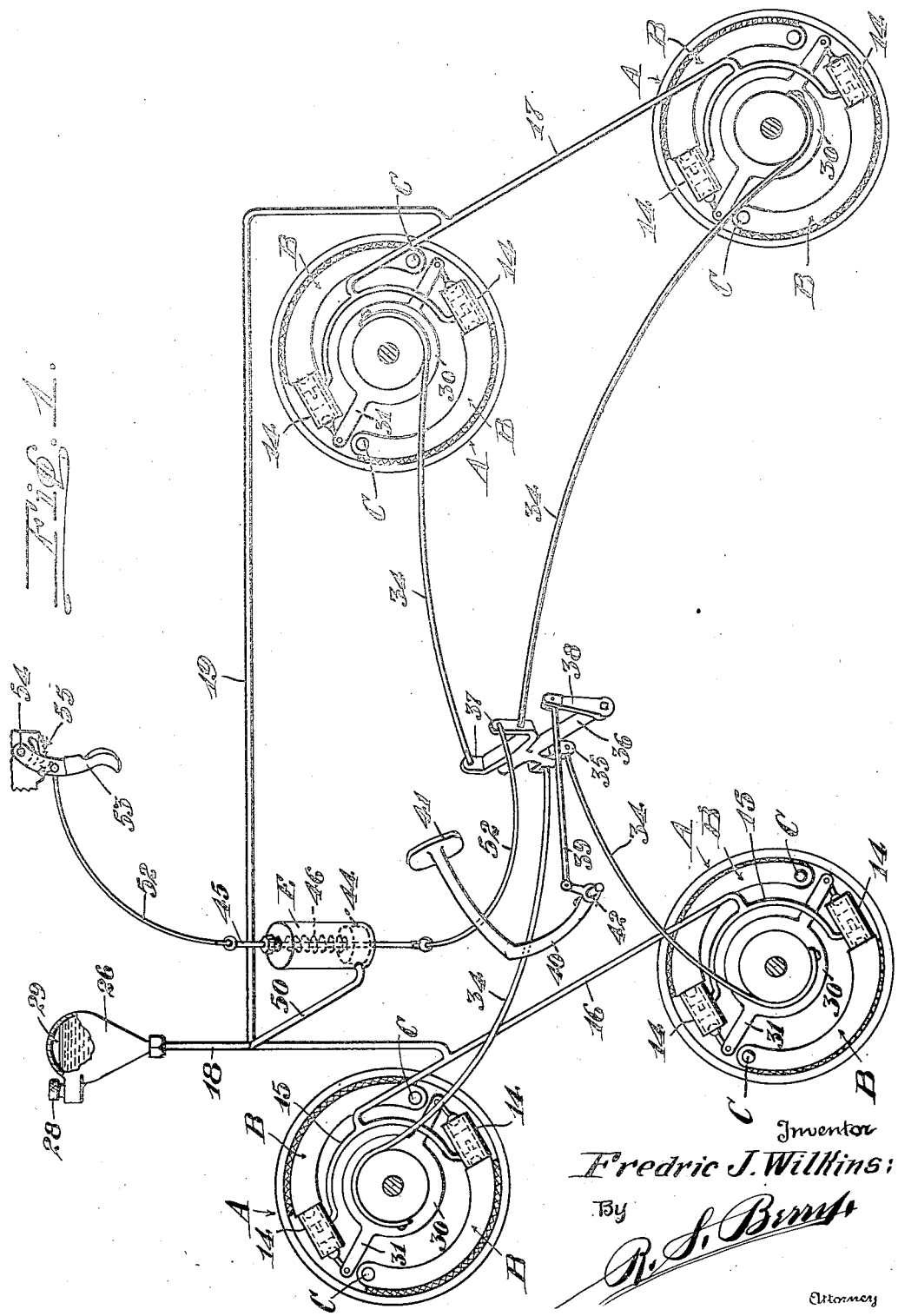

2,155,030

UNITED STATES PATENT OFFICE 2,155,030

BRAKE OPERATING MECHANISM

Fredric J. Wilkins, Glendale, Calif.

Application December 24, 1937, Serial No. 181,500

9 Claims. (Cl. 188—106).

This invention relates to brake operating mechanism and particularly pertains to the brake control systems of motor vehicles and the like.

An object of the invention is to provide a means whereby application of the several brakes of a motor vehicle may be effected through a fluid transmission by actuation of a mechanical brake applying mechanism so as to obtain the advantages of hydraulic brakes, particularly as to uniformity of braking action throughout a plurality of brakes, and yet retain the advantages of mechanically operated brakes as to positive application in event of failure of the fluid transmission.

Another object is to provide a hydraulic transmission mechanism which is adapted to be applied to a conventional type of mechanically operated brake system so as to cooperate with the latter in effecting application of the brakes.

Another object is to provide a hydraulic transmission unit which is adapted to be interposed between a brake and a mechanical applicator at a point contiguous the brake, which unit is so formed that in event of excessive loss of transmission liquid, application of the brakes may be effected directly by the mechanical applicator.

Another object is to provide a hydraulic transmission system for use in conjunction with a mechanical brake-actuating mechanism embodying air cushioning means for absorbing excessive shocks and relieving the hydraulic transmission line of excessive pressures.

Another object is to provide a construction and arrangement in a combined hydraulic transmission and mechanical brake-actuating mechanism whereby the hydraulic transmission may be placed out of operative relation to the brake-actuating mechanism at will, and whereby the service brakes of a motor vehicle may be applied positively by the mechanical actuating mechanism, and whereby such service brakes may be utilized as emergency or parking brakes.

A further object is to provide a hydraulic transmission unit which is adapted to be interposed between a pair of closely asociated relatively movable parts together with means for limiting the action of the hydraulic transmission in said unit to a pre-determined extent and thereafter permit direct and positive transmission of movement from one of the parts to the other, and together with means whereby the hydraulic transmission may be placed out of operative relation to said relatively movable parts as occasion may require.

With the foregoing objects in view, together with such other objects and advantages as may subsequently appear, the invention is carried into effect as illustrated by way of example in the accompanying drawings, in which:

Fig. 1 is a diagram depicting the application of the invention to the braking system of a motor vehicle;

Fig. 2 is a view in elevation and partly in section showing a manner of applying the hydraulic transmission unit in a motor vehicle brake and showing the parts as disposed in a normal position;

Fig. 3 is a view in section and elevation of one of the hydraulic transmission units depicted in Fig. 2 showing the parts as disposed in an operated position with the brake applied through the transmission liquid;

Fig. 4 is a view similar to that shown in Fig. 3 showing the parts as disposed when the transmission liquid is out of operation and the brake mechanically applied;

Fig. 5 is a detail in cross section taken on the line 5—5 of Fig. 3;

Fig. 6 is a diagram depicting the means for placing the hydraulic transmission liquid in and out of operative relation to relatively movable driving and driven elements of a brake operating mechanism;

Fig. 7 is a diagram illustrating the application of the device shown in Fig. 6 to the mechanical brake-actuating mechanism of a motor vehicle and depicting the manner of its utilization in permitting positive mechanical operation of the vehicle service brakes independent of the hydraulic transmission fluid and showing the manner in which the service brakes may be operated to serve as a parking brake;

Fig. 8 is a view in elevation, partly in section, depicting another manner of applying the hydraulic transmission unit to a motor vehicle brake and depicting a modified form of the invention;

Fig. 9 is a view in horizontal section as seen on the line 9—9 of Fig. 8;

Fig. 10 is a view in section and elevation depicting a modified form and application of the invention;

Fig. 11 is a diagram illustrating the mode of operation of the invention.

Referring to the drawings more specifically A indicates a conventional brake drum which is fitted with a pair of brake shoes B arranged for engagement with the inner periphery of the drum A, which shoes are mounted for pivotal movement toward and away from the drum on pivots C, and are normally held out of braking engagement with the drum by springs (not shown) in the conventional manner.

In the construction shown in Figs. 1 and 2 the brake shoes are arranged to extend in opposite directions relative to each other from their pivotal mountings C.

In carrying out the invention a hydraulic transmission cylinder 14 is interposed between the free end of one of the brake shoes and the pivoted adjacent end of the other brake shoe, thus providing a pair of the cylinders 14 within the brake drum.

In the diagram shown in Fig. 1 a series of four brake drums A are shown in representation of the brake drums on the front and rear pairs of wheels of a motor vehicle, with each of the drums correspondingly equipped with the brake shoes B and the cylinders 14. The interiors of the cylinders 14 are in communication with each other through a system of conduits here shown as embodying an arcuate length of conduit 15 arranged in each drum A having its ends connecting with the pair of cylinders 14 in the drum at points intermediate the ends of the cylinders. The arcuate conduit 15 of the front pair of cylinders A, indicated at the left side of Fig. 1, are connected together by a conduit 16, and the arcuate conduit 15 of the rear pair of cylinders A, indicated at the right side of Fig. 1, are connected together by a conduit 17. An upwardly extending conduit 18 leads from the conduit 16 and connects intermediate its ends with a conduit 19 leading to the conduit 17 thus affording communication between the conduit elements of the front and rear pairs of brake assemblies.

Mounted in each of the cylinders 14 for longitudinal reciprocal movement therein is a pair of spaced pistons 20 and 21 arranged on opposite sides of a passage 22 with which the arcuate conduit 15 communicates. The piston 20 abuts against a spherical bearing 23 carried on the free end of a brake shoe B and when in its innermost position abuts a shoulder 24 on the interior of the cylinder 14, which shoulder serves to limit inward movement of the piston 20 and whereby it is prevented from being moved to a position in which it would close or restrict the passage 22. The piston 21 normally abuts an inturned marginal flange 25 on the cylinder 14 which flange serves to limit outward movement of the piston 21 relative to the cylinder. The space in the cylinders 14 between the pistons 20 and 21 and extending throughout the communicating conduits 15, 16, 17, 18 and 19, is filled with a suitable transmission liquid such as is commonly employed in hydraulic transmission systems; the liquid being supplied to such space from a reservoir 26 with which the upper end of the conduit 18 is connected and which reservoir 26 is fitted with an intake passage 27 normally closed by a removable cap 28. The reservoir 26 is formed with a domed upper portion in which a body of air is trapped on filling the reservoir with the liquid to form an air cushion as indicated at 29. The volume of air constituting the cushion 29 is comparatively small relative to the volume of transmission liquid interposed between the several pairs of pistons 20 and 21, and such as to permit only slight displacement of the fluid throughout the line on subjecting the fluid to braking pressure.

Connecting with the pistons 21 in the cylinders 14 of each brake drum A is an actuator D embodying a turnably mounted ring 30 formed with radially extending arms 31 projecting from diametrically opposed portions thereof the outer ends of which arms connect with links 32 having spherical outer end portions 33 which seat against the outer ends of the pistons 21. Connecting with each of the rings 30 and partly wound thereon is a cable 34 so arranged that on a pull being imparted thereto the rings 30 will be turned in a direction so as to cause the arms 31 and links 32 to press the pistons 21 inwardly. The cables 34 constitute the usual mechanical connection commonly employed for effecting operation of mechanically actuated brakes; the cables 34 leading from the forward pair of brakes A connecting with down-turned arms 35 on a rock-shaft 36 while the cables 34 of the rearward pair of brakes connect with upwardly extending arms 37 on the rock-shaft. A crank arm 38 on the rock-shaft 36 is connected by a link 39 with the short arm of a bell crank lever 40 the long arm of which is fitted with a foot rest 41, and which lever constitutes the usual brake pedal of a motor vehicle pivoted at 42 in conventional fashion.

Advance of the pistons 21 ordinarily operates through a volume of the transmission liquid interposed between the pistons 21 and 20 to effect advance of the latter and thereby effect application of the brakes B. However, means are provided for effecting direct mechanical connection between the pistons 21 and 20 as in event of excessive leakage of the transmission liquid such as to cause accidental failure of the hydraulic transmission system or by preferably permitting displacement of the transmission liquid when it is desired to effect mechanical application of the brakes. This means is here shown as embodying a pin 43 extending between each pair of the pistons 20 and 21 and here shown as mounted on the piston 20 and arranged with the outer end thereof normally spaced from the piston 21. Manifestly if the volume of transmission liquid is depleted from any cause or allowed to be displaced sufficiently to permit the piston 21 to move into engagement with the outer end of the pin 43 then continued inward movement of piston 21 will be transmitted through the pin 43 to the piston 20.

The pins 43 are of such length in relation to the distance between the pistons 20 and 21 when the pistons are retracted relative to each other as to afford sufficient clearance between the ends of the pins and the adjacent pistons 21 to permit lost motion advance of the pistons 21 toward the pistons 20 under ordinary conditions such distance as will be occasioned by reason of compression of the air cushion 29 without the pins 43 meeting the pistons 20.

Means are provided for permitting displacement of such volume of the liquid contained in the cylinders 14 under manual control so as to allow the piston 21 to advance into engagement with the pin 43 to effect positive transmission of movement from the piston 21 to the piston 20. This means as here shown embodies a vertically extending cylinder E in which is a piston 44 on a reciprocal rod 45 extending axially through the cylinder and mounted for reciprocal movement longitudinally of the cylinder. The piston 44 is normally maintained in a seated position at the lower end of the cylinder under the urge of a spring 46 arranged interiorly of the cylinder and bearing between the upper face of the piston 44 and a cap 47 forming the upper end wall of the cylinder and through which the rod 45 extends. The bottom wall of the cylinder is provided with a packing gland 48 encompassing the rod 45.

Leading through the side wall of the cylinder E is a passage 49 which is normally closed by the circumferential portion of the piston 44 and which passage leads to a conduit 50 communicating with the interiors of the cylinders 14 as depicted diagrammatically in Figs. 6 and 7.

Manifestly the conduit 50 may be brought into communication with the interiors of the cylinders 14 by connecting with any of the conduits of the piston, being here shown in Fig. 1, for example, as connected with the conduit 18.

The lower end of the piston rod 45 is connected by a cable 51 to one of the upstanding arms 37 of the rock-shaft 36, the cable 51 leading from the arm 37 in a direction opposite that of the cables 34 leading to the rear brake assembly, whereby upward movement of the piston rod 45 will effect a pull on the cable 51 in such direction as to effect application of the brakes. The upper end of the piston rod 45 connects with a cable 52 leading to a hand lever 53 pivoted at 54 and adapted to be held in various positions in opposition to the spring 46 in the cylinder E by a conventional ratchet 55.

The invention is applicable for use with various arrangements of brake structures. For example, as illustrated in Fig. 8, where the brake drum A is equipped with a pair of brake shoes F pivoted at their adjacent ends, a cylinder 14 is interposed between the free ends of the brake shoe and is fitted at its ends with a pair of pistons *a* against which the outer ends of the brake shoes F abut. In this instance a pair of pistons *b* are spaced from the pistons *a* and form with the latter a pair of chambers in which transmission fluid is contained; the chambers being in communication with each other through a conduit *c* connecting with a conduit *d* in the general hydraulic transmission fluid conduit system. The pistons *b* are equipped with pins *e* which extend toward but are spaced from the inner faces of the pistons *a*.

Interposed between the pistons *b* is a cam *f* against which the pistons *b* bear under the urge of a spring *g*, and which cam *f* is mounted on a rock-shaft *h* fitted with a crank *i* connecting with an operating rod *j* through which the rock-shaft *h* and cam *f* may be rocked to advance the pistons *b* collectively toward the pistons *a* and thereby transmit movement to the latter either through the body of liquid interposed between the pistons or through the medium of the pins *e*, as before described in connection with the structures shown in Figs. 2, 3 and 4. The brake shoes F are normally retained in a retracted position by means of a spring *k* as is common in brakes of this character.

Another mode of application of the invention is depicted in Fig. 10 in which the piston 20 in the cylinder 14 is fitted with a brake rod 56 supported for longitudinal movement in a guide 57, and between which guide and the piston 20 is a spring 58 which acts to normally retain the piston 20 in its retracted position. A lever 59 pivoted at 60 has one end thereof curved and abutted against the piston 21 and the other end of which is connected to an operating rod 61 adapted to be actuated to effect operation of the lever 59 to effect advance of the piston 21 thereby advance the piston 20 through the volume of liquid contained in the cylinder 14 or through the pin 43 in the fashion recited in connection with the structure shown in Fig. 2.

In Fig. 11, which illustrates diagrammatically the mode of operation of the invention, the actuator piston 21 is shown as fitted with a stem 62 which leads to any suitable source of power for effecting advance thereof and of the piston 21, and the piston 20 is fitted with a stem 63 leading to any suitable mechanism to be operated by advance to the piston 20. The stem 63 passes through and is guided in an end cap 64 on the cylinder 14 between which cap and the piston 20 is a spring 65 which acts normally to maintain the piston 20 in its retracted position.

In the operation of the invention, which will be best understood by reference to Fig. 11, initial advance movement of the piston 21 will act to displace a portion of the liquid L in the cylinder 14 such as to compress the volume of entrapped air 29 in the reservoir 26 which compression occurs until pressure is built up in the reservoir 26 and the connecting lines of the system as to off-set the resistance offered to advance movement of the piston 20, whereupon continued advance of the piston 21 will act to transmit movement to the piston 20 through the body of the liquid L contained in the cylinder 14. The entrapped air acts as a spring to cushion initial application of pressure to the transmission liquid, and manifestly offers increasing resistance to compression up to a point of liquification, and is in such small volume as not to permit piston 21 to advance relative to the piston 20 such distance as to bring the pin 43 into contact with the piston 20. A hydraulic transmission is thus effected between the pistons 21 and 20. As before stated, in event of leakage of the transmission liquid from the system such that the liquid would be rendered ineffectual, then the piston 21 on advancing into engagement with the end of the pin 43 will act through the latter to effect positive movement of the piston 20. However, when it is desired to effect such positive movement of the piston 20 the piston 44 in the cylinder E is moved to open the port 49 and thereby permit such quantity of the transmission liquid L to enter the lower end portion of the cylinder E beneath the piston 44 as to allow the piston 21 to advance into contact with the pin 43 on the piston 20.

In the operation of the invention as applied to the brakes of a motor vehicle as depicted in Fig. 1, when it is desired to apply the brakes the operator depresses the foot lever 40 in the usual manner thereby rocking the rock-shaft 36 in such direction as to effect a pull on the cables 34 and thereby turn the rings 30 such as to cause the pistons 21 to advance against the liquid in the cylinders 14 and act through the latter to advance the piston 20 and thereby effect application of the brakes. It will be noted that by reason of the several cylinders 14 being in communication with each other a uniform distribution of power to the several brakes will occur thus insuring an equalization of brake pressures throughout the several brakes. Release of the brakes is accomplished by retraction of the foot lever 40, cables 34, rings 30 and brake shoes B in the usual manner.

When it is desired to utilize the brakes in parking the vehicle where it is undesirable to rely upon the transmission liquid in retaining the brakes applied, the piston 44 in the cylinder E is retracted by advancing the hand lever 53 and at the same time the foot lever 40 is depressed so as to effect displacement of the liquid L from between the pistons 20 and 21 so that continued movement of the piston 21 will be transmitted directly to the pistons 20 to apply the brakes mechanically. On the hand lever 53 being held against retraction by the ratchet 55 in the conventional fashion which will hold the cables 14, rings 30 and pistons 21—20 advanced, the brakes B will be held in their directly applied position until their release is effected by returning the hand lever 53 to its retracted position which permits the brakes shoes to retract in the usual manner. Retraction of the lever 53 causes the piston 44 to return to normal under the urge of the spring 46 and thereby reestablish the body of liquid L between the pistons 20—21 for resumption of the hydraulic transmission.

While I have shown and described a specific embodiment of my invention I do not limit myself to the exact construction shown, and accordingly the invention embraces such changes and modifications in the parts and their arrangement as come within the purview of the appended claims.

I claim:

1. In a brake operating mechanism, a brake, an actuator for said brake adjacent thereto, a cylinder interposed between said brake and actuator, a pair of pistons in said cylinder, a liquid interposed between said pistons and confined to afford a hydraulic transmission between said pistons, connections between one of said pistons and said brake, connections between the other of said pistons and actuator, manually operable mechanical means for operating said actuator, and means in said cylinder for effecting direct operative connection between said pistons on displacement of liquid from therebetween.

2. In a brake operating mechanism, a brake, an actuator for said brake adjacent thereto, a cylinder interposed between said brake and actuator, a pair of pistons in said cylinder, a liquid interposed between said pistons and confined to afford a hydraulic transmission between said pistons, connections between one of said pistons and said brake, connections between the other of said pistons and actuator, manually operable mechanical means for operating said actuator, and means affording displacement of liquid between said pistons including means for cushioning such displacement.

3. In a brake operating mechanism, a brake, an actuator for said brake adjacent thereto, a cylinder interposed between said brake and actuator, a pair of pistons in said cylinder, a liquid interposed between said pistons and confined to afford a hydraulic transmission between said pistons, connections between one of said pistons and said brake, connections between the other of said pistons and actuator, manually operable mechanical means for operating said actuator, and manually operable valve controlled means for releasing liquid from between said pistons.

4. In a brake operating mechanism, a brake, an actuator for said brake adjacent thereto, a cylinder interposed between said brake and actuator, a pair of pistons in said cylinder, a liquid interposed between said pistons and confined to afford a hydraulic transmision between said pistons, connections between one of said pistons and said brake, connections between the other of said pistons and actuator, manually operable mechanical means for operating said actuator, means in said cylinder for effecting direct operative connection between said pistons on displacement of the liquid from therebetween, and manually operable means for releasing liquid from between said pistons.

5. In a brake operating mechanism, a plurality of brake drums, a brake in each of said drums, a brake actuator adjacent each of said brakes, a cylinder interposed between each actuator and its associated brake, a pair of pistons in said cylinder, connections between said pistons and the actuator and brake adjacent thereto, a liquid contained in each of said cylinders between the pistons therein, and liquid filled conduits connecting the bodies of liquid in the several cylinders collectively together.

6. In a brake operating mechanism, a plurality of brake drums, a brake in each of said drums, a brake actuator adjacent each of said brakes, a cylinder interposed between each actuator and its associated brake, a pair of pistons in said cylinder, connections between said pistons and the actuator and brake adjacent thereto, a liquid contained in each of said cylinders between the pistons therein, liquid filled conduits connecting the bodies of liquid in the several cylinders collectively together, and manually controlled mechanical means for actuating said actuators collectively.

7. In a brake operating mechanism, a plurality of brake drums, a brake in each of said drums, a brake actuator adjacent each of said brakes, a cylinder interposed between each actuator and its associated brake, a pair of pistons in said cylinder, connections between said pistons and the actuator and brake adjacent thereto, a liquid contained in each of said cylinders between the pistons therein, liquid filled conduits connecting the bodies of liquid in the several cylinders collectively together, manually controlled mechanical means for actuating said actuators collectively, manually controlled means for effecting displacement of liquid between said pistons, and means for effecting direct connection between said pistons on displacement of the liquid therebetween.

8. In a brake operating mechanism, a cylinder, a pair of pistons in said cylinder, a body of liquid interposed between said pistons, brake operating connections leading from one of said pistons, manually operable means for actuating the other of said pistons, a second cylinder, a conduit leading from said last named cylinder to the liquid in the first named cylinder, means for opening and closing the communication between said cylinders to said conduit adapted to be operated to permit displacement of liquid between said pistons, and means for effecting positive connection between said pistons on displacement of liquid therebetween.

9. In a brake operating mechanism, a cylinder, a pair of pistons in said cylinder, a body of liquid interposed between said pistons, brake operating connections leading from one of said pistons, manually operable means for actuating the other of said pistons, a second cylinder, a conduit leading from said last named cylinder to the liquid in the first named cylinder, means of opening and closing the communication between said cylinders to said conduit adapted to be operated to permit displacement of liquid between said pistons, means for effecting positive connection between said pistons on displacement of liquid therebetween, and an enclosed liquid reservoir connecting with said conduit.

FREDRIC J. WILKINS.